United States Patent [19]
Daringer

[11] Patent Number: 5,558,204
[45] Date of Patent: Sep. 24, 1996

[54] MODULAR COMPONENTS AND WELD-FREE BELTING ASSEMBLY

[75] Inventor: Ronald G. Daringer, Cambridge, Md.

[73] Assignee: Maryland Wire Belts, Inc., Church Creek, Md.

[21] Appl. No.: 294,395

[22] Filed: Aug. 23, 1994

Related U.S. Application Data

[63] Continuation-in-part of Ser. No. 56,875, May 5, 1993, Pat. No. 5,375,695, and a continuation-in-part of Ser. No. 217,565, Mar. 25, 1994.

[51] Int. Cl.$^6$ ................................................ B65G 21/18
[52] U.S. Cl. ................................. 198/778; 198/851
[58] Field of Search ........................... 198/851, 853, 198/778

[56] References Cited

U.S. PATENT DOCUMENTS

| | | | |
|---|---|---|---|
| 2,631,465 | 3/1953 | Cordis | 198/851 |
| 2,743,003 | 4/1956 | Allen | 198/851 |
| 3,344,907 | 10/1967 | Van Valkenburgh | 198/851 |
| 3,742,863 | 7/1973 | Rosenberger, Jr. | 198/851 X |
| 4,050,323 | 9/1977 | l'Anson | 198/853 |
| 4,080,842 | 3/1978 | Lapeyre et al. | 198/853 X |
| 4,213,527 | 7/1980 | Lapeyre et al. | 198/853 |
| 4,545,098 | 10/1985 | Schroer | 198/851 X |
| 5,197,593 | 3/1993 | Funkhouser | 198/851 |

*Primary Examiner*—D. Glenn Dayoan
*Attorney, Agent, or Firm*—Shanley and Baker

[57] ABSTRACT

Weld-free belt assembly in which elongated link modules are coupled in widthwise side-by-side relationship by transversely-oriented coupling modules. An internal cavity is defined within each link along with a surface configuration on each side of the link which defines an entry access portion for a coupler and slot portions for enabling relative longitudinal movement of the coupler while retaining the coupler within the internal cavity. The interfitting coaction of the links and couplers enables an assembled belt to move from linear planar travel into a curved path to establish an endless-belt configuration. The relative movement of couplers within a link cavity enables longitudinal collection of links along the inner circumference when the belt enters a curvilinear travel path in approximately the same plane and enables re-extension for return to linear travel. An assembled belt can be driven longitudinally by sprockets; and, also, can be driven along a serpentine path by lateral-edge dynamic frictional drive, or in a similarly driven layered helical-path "carousel" arrangement. Special configuration lateral-edge links provide protrusion-free lateral edge surfaces enabling smooth dynamic frictional drive along inner circumference surfaces during curvilinear travel.

25 Claims, 7 Drawing Sheets

MODULAR COMPONENTS AND WELD-FREE BELTING ASSEMBLY

This application is a continuation-in-part of co-owned U.S. Pat. application Ser. No. 08/056,875, filed May 5, 1993 now U.S. Pat. No. 5,375,695, and of copending and co-owned U.S. Pat. application Ser. No. 08/217,565, filed Mar. 25, 1994 pending.

The present invention relates to modular component configurations enabling weld-free assembly of belting. More particularly, the invention is concerned with the capability for readily combining components, weld-free, enabling on site selection of length and width dimensions for various belt travel paths using differing belt drive apparatus.

In one of its more specific aspects, the invention enables belt component manufacture from diverse materials to provide physical properties which expand the range of treatments available during conveyance while enabling combinations of travel path characteristics and belt drive methods.

Woven metal wire conveyor belts serve important functions in industry. However, woven metal wire belts are time and labor intensive; requiring (i) forming of metal wire spirals, (ii) interweaving of the spirals with transversely-oriented metal connector rods, and (iii) hand welding of metal spirals and rods at each lateral edge of the belting.

Also, notwithstanding that the metal wire belt length and width specifications are determined by space requirements at the user's site, the practice has been, because of the above wire belt assembly requirements, to have metal wire belt assembled by the belt manufacturer at the belt manufacturer's site.

The present invention increases both the versatility of assembly and range of applications over those available with woven wire belts. Other advantages and contributions are considered in more detail in describing methods of the invention and embodiments shown in the accompanying drawings, in which:

Special coacting configurations of lengthwise-directed elongated links and a plurality of widthwise-directed couplers (FIGS. 1–4) cooperate to enable weld-free assembly of belting (FIG. 5) of desired length, width, travel path characteristics, and drive capabilities.

Figure 1:
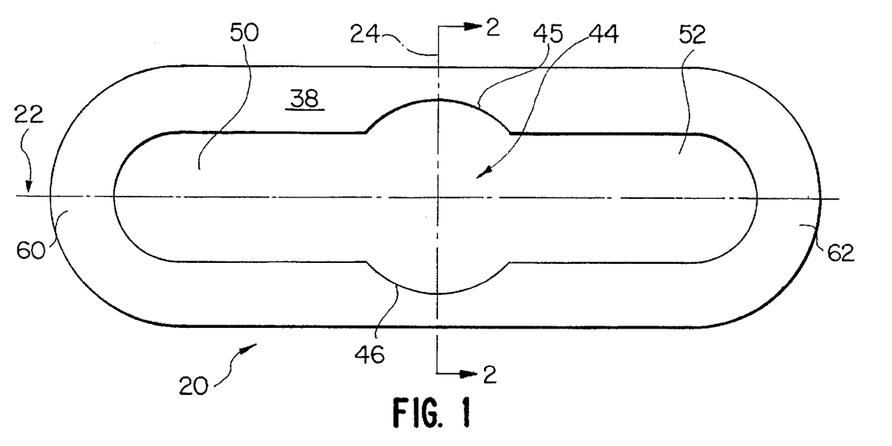
FIG. 1 is a side elevational view for describing an elongated link module of the invention.

Referring to FIG. 1, an elongated link 20 is symmetrically disposed with relation to longitudinally-directed axis 22 and vertically-oriented centrally located cross-sectional plane 24. The perspective view of FIG. 2 starts along such cross-sectional plane 24 depicting an interior cavity and external surface portions of link 20; those portions shown in FIG. 2 are substantially mirror image on either longitudinal side of the centrally located plane 24.

Figure 2:
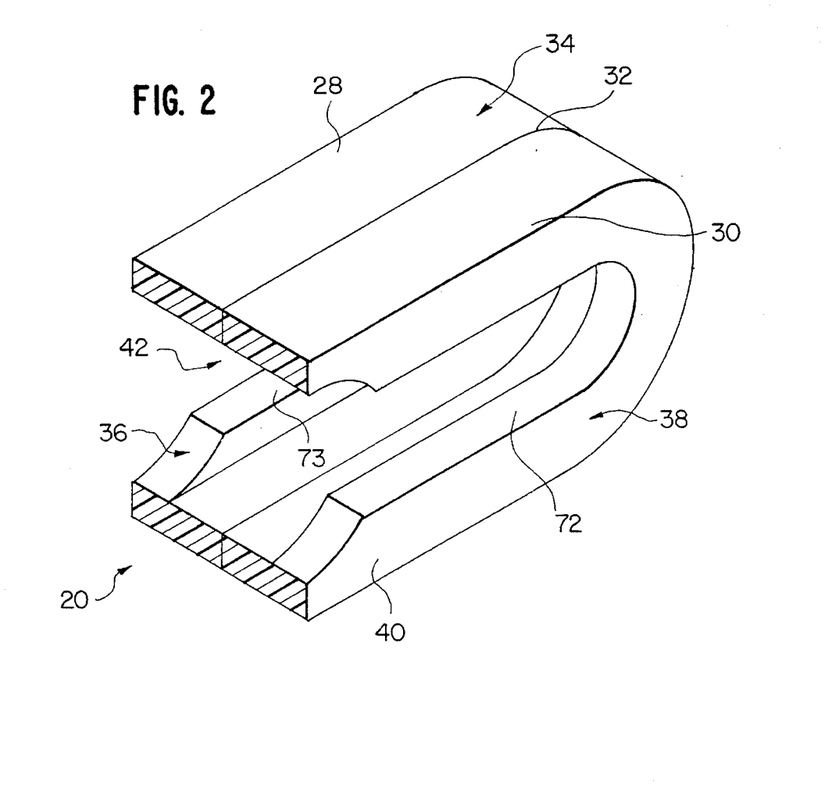
FIG. 2 is a sectional perspective view, taken from the section line 2–2 in FIG. 1 longitudinal center of the link module of FIG. 1, for describing its interior cavity configuration.

Elongated link 20, as indicated by the partial view of FIG. 2, is fabricated from half-links 28, 30 which are integral along line 32. External walls of link 20 include an upper conveying-surface wall 34, side walls 36, 38 and lower wall 40; the latter is oppositely disposed in relation to upper surface 34. The external walls of link 20 encase an elongated internal cavity 42, half of which is shown in the partial view of FIG. 2.

Referring to FIG. 1, side wall entry into the elongated internal cavity of link 20 is through access opening 44. The latter is partially defined by circumferential portions 45, 46 of circular configuration in side wall 38; such access opening extends transversely through side walls 36 and 38 as indicated by FIG. 2.

Elongated slot means 50, 52 (FIG. 1) extend into the internal cavity of link 20 from access opening 44 toward each respective distal end 60, 62 of the elongated link. The cross-sectional dimensional and configuration characteristics of access opening 44 correspond to those of flange 64 or 66 of coupler 68 of FIG. 3 (and corresponding portions of the elongated coupler of FIG. 4, described subsequently.)

Figure 3:
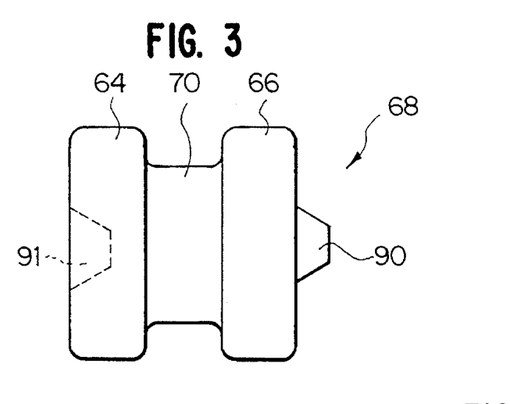
FIG. 3 is an elevational view of a foreshortened coupler module of the invention with a subsurface portion shown in interrupted lines.

When a coupler is transversely aligned perpendicular to the longitudinal axis of the link, the cylindrical outer surface of flange 64 fits through opening 44 of FIG. 1; and, a groove means, such as centrally located groove 70 of the coupler of FIG. 3, can then move along the slot wall surface 72 (FIG. 2) defined by side wall 38. Slot wall 73 is defined by side wall 36 on the opposite side of the internal cavity. The flange, such as 64, of coupler 68 (FIG. 3) is retained within the internal cavity 42 as coupler 68 moves toward distal end 62 of link 20.

The access opening 44 and elongated slot portions 50, 52 cooperate, respectively, to receive and to retain a coupler, or pair of couplers, within the link cavity. The couplers and links coact during belt travel to maintain a desired type of alignment.

Figure 4:
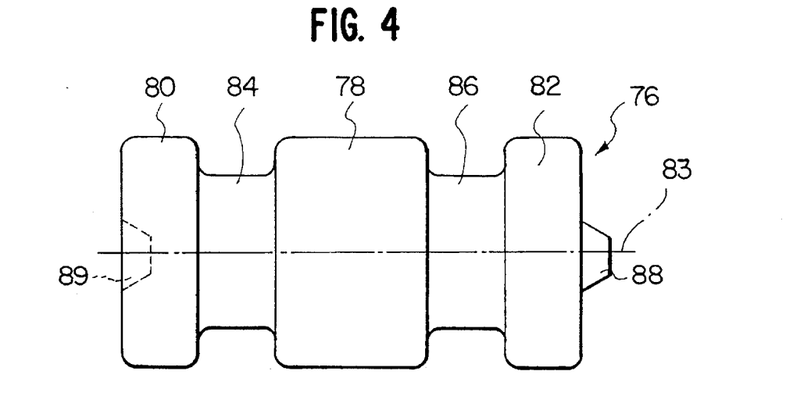
FIG. 4 is an elevational view of another embodiment of a coupler module of the invention.
Figure 5:
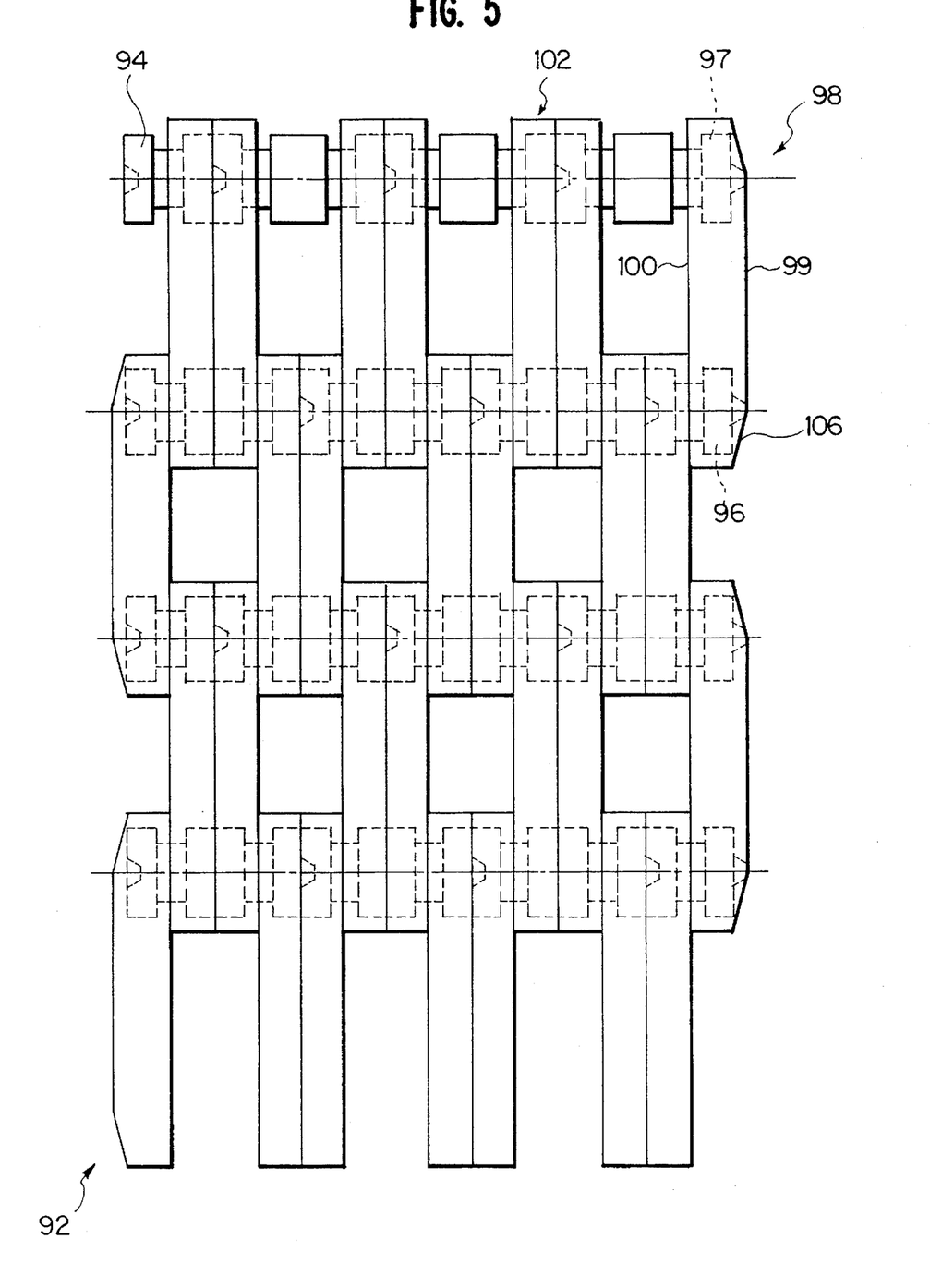
FIG. 5 is a general arrangement plan view for describing belt assembly, in the intended direction of travel, with subsurface portions of the modules of FIGS. 1–4 shown in interrupted lines.

In the belt assembly of FIG. 5, the foreshortened coupler of FIG. 3 is used, at alternate lateral-edge locations of the belt. The greater-length elongated coupler 76 of FIG. 4 is used in the main body portion of the belt intermediate lateral edges; however, elongated couplers 76 can be located at selected lateral ends during assembly of a belt, dependent on the number of coupler modules used across the width of the belt being assembled.

The outer circumferential surface portions of the couplers of FIGS. 3, 4 have a cylindrical configuration to augment smooth-pivotal rotation of links, about such curved outer surfaces of the couplers, during movement in an endless belt configuration, into, through, and out of a curved-surface return path. During endless belt type of travel, as described herein, the central longitudinal axis of the belt remains in the same vertical plane as the belt moves from planar travel around a curved path to another plane of travel.

Referring to FIG. 4, central portion 78 of elongated coupler 76 is separated from distal end flanges 80, 82, respectively, by grooves 84, 86. Longitudinal ends of elongated coupler 76, and of coupler 68 (FIGS. 4, 3 respectively), utilize transverse, that is, widthwise directed, alignment means. Such alignment means take the form of truncated-conical protrusion 88 (FIG. 4) and concave receptor 89, of similar truncated-conical configuration, at the remaining longitudinal end. Such alignment protrusion and receptor means for coupler 68 (FIG. 3) are shown at 90, 91, respectively.

In the illustrated cylindrical configuration coupling embodiment of FIG. 4, the two flange members 80 and 82 have a total axial dimension (in the direction of central axis 83) which is equal, or approximately equal, to that of the main body member 78. And each groove 84, 86 has a dimension along axis 83 to enable each groove to accommodate twice the width (thickness) dimension of that portion of a lateral side which helps to define the internal cavity 42 (FIG. 2). That is, the width of side wall defined surfaces 72, 73 of FIG. 2 can be accommodated by groove 84 or 86 of FIG. 4 as the coupler 76 moves toward a distal end of an elongated link 20 after being received in access opening 44.

The width-wise dimension of spaced apart grooves 84, 86 of coupler 76 of FIG. 4 interconnects pairs of links by receiving pairs of coupler flanges, as shown in FIG. 5. The dimensions are selected with tolerances (set forth later) to provide for desired longitudinally-directed movement of a central body portion (78), or a pair of flanges, within an internal link cavity and a groove (84 or 86) to accommodate a pair of side wall defined portions (72, 73) moving in such longitudinal direction of a link while inhibiting width-wise directed movement (play) of modules to the extent it could be a detriment to travel in the intended direction.

As seen in FIG. 5, such truncated-configuration protrusion/receptor means of a coupler enhance the ability of couplers, positioned in interfitting relationship across the width of the belt 92, to act as a weld-free connector rod about which the links can rotate during endless-belt travel. Starting at the upper left corner of FIG. 5, the first coupler 94 is the foreshortened type shown in FIG. 3, and each of the remaining (three) couplers in that row across the width of the belt 92 is the elongated type shown in FIG. 4. In the embodiment of FIG. 5, a foreshortened coupler is used at alternate lateral-edge locations; for example, lateral-edge coupler 96 is a foreshortened type.

Within the intermediate-located elongated links of FIG. 5, a central body member (such as 78 in the coupler of FIG. 4) occupies the internal cavity at one longitudinal end of a link; and, a pair of flanges, one each from separate laterally-contiguous couplers, is located at the remaining opposite longitudinal end of such link. That alternating arrangement of couplers continues in each adjacent row of links extending in the direction of travel of the belt, as shown in FIG. 5.

Tension drive means, such as sprocket drives, act in the spaces shown, preferably at locations where a central body member is positioned within the internal cavity, to drive the belt longitudinally.

In order to facilitate frictional drive along one or both lateral edges of the belt, link modules at lateral edges of the belt have a specific configuration as shown in FIG. 5. As taught herein, when the central longitudinal axis of a belt travels in a serpentine path, or related type of curvilinear travel path, provision is made for dynamic-frictional drive of the belt at the lateral edge on the inner circumference of the curvilinear travel path. The lateral edge on the inner circumference can alternate in a serpentine travel path, and can remain the same throughout a plurality of stacked curvilinear helical paths, as described in assignee's copending application Ser. No. 08/056,875 (filed May 5, 1993) which is incorporated herein by reference, with particular reference to page 12, line 18 to page 14, line 11.

Flange means of couplers located at a lateral edge of a belt are interconnected by such specific configuration lateral-edge links when the belt is to be driven by dynamic friction. For example, the flange 96 and flange 97 (at the upper right lateral side of belt 92 of FIG. 5), are interconnected by lateral-edge link 98. Such lateral-edge links preferably present a smooth outer surface 99 with no protruding couplers along the exposed lateral edge of the belt; protrusion-free lateral-edge links increase the range of frictional drive surfaces. The side wall configuration of the illustrated lateral-edge link embodiment can be better observed in a later perspective view.

The disposition of the couplers, and the configuration of the internal cavities of the links, are shown in interrupted lines in FIG. 5. The interior cavity side wall 100 of lateral-edge link 98 presents an access opening and slot means similar to that described earlier, in relation to FIGS. 1 and 2, for receiving and movement of flange means 96, 97 of the next adjacent coupler in the longitudinal direction of travel.

As depicted in FIG. 5, the special lateral-edge link (such as 98) has substantially the same length as, but is narrower in width than, an integral link, such as link 20 of FIG. 2, or link 102 as shown in FIG. 5. The narrower-width dimension of the internal elongated cavity of a lateral-edge link facilitates retention, and slidable or rotational movement, of a single distal end coupler flange. Portions of the exterior side wall surface of the lateral-edge links are preferably bevelled, as shown at 106. Such bevelled configuration 106 facilitates smoother application of dynamic frictional drive from a vertically-oriented drive means along a curvilinear configuration.

Figure 6:
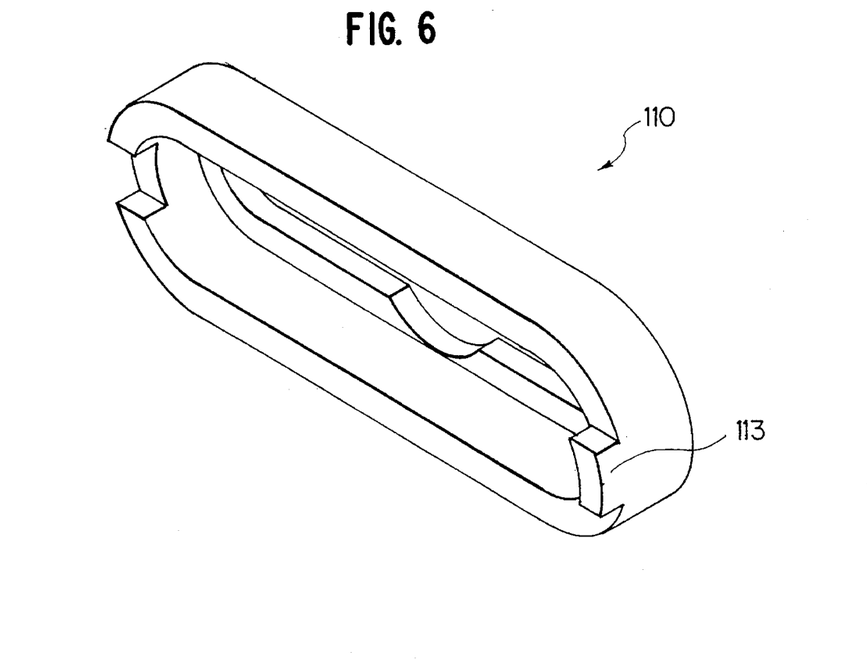
FIGS. 6 and 7 are perspective views of elongated half-link elements of the invention for describing alignment, reception and retention along half-link confronting surfaces which coact during fabrication of an integral link, of the type shown in FIGS. 1 and 2.
Figure 7:
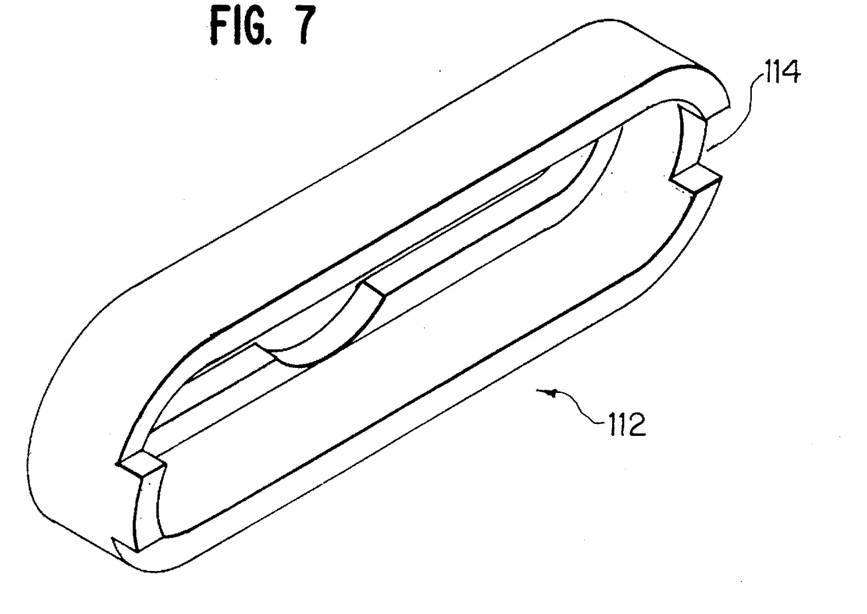
Figure 8:
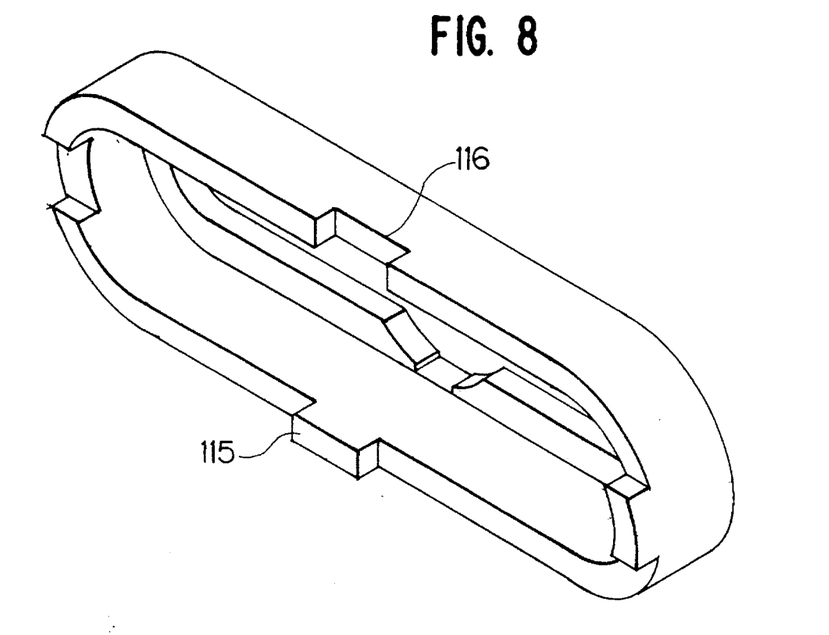
FIG. 8 is a perspective view of another embodiment of an elongated half-link element of the invention for describing alignment, reception and retention along half-link confronting surfaces.

FIGS. 6 and 7 depict one embodiment of a pair of half-links 110, 112 to be joined in opposed confronting relationship to form an integral link which presents the external and internal configurations of the integral link shown and described in relation to FIGS. 1 and 2. FIG. 8 depicts another half-link embodiment.

Each half-link presents an interfitting configuration on confronting side surfaces. Such interfitting configurations can include a tooth-shaped laterally-extending projection 113 (FIG. 6) and a correspondingly-shaped receptor portion 114 (FIG. 7). Such half-link interfitting and interlocking means can be advantageously located at curved end portions of confronting surfaces; and, also, as shown in the embodiment of FIG. 8, with alignment and interlocking means 115, 116 additionally located intermediate longitudinal distal ends of the link.

Projector 115 and receptor 116, of FIG. 8, add to the interlocking strength provided by projection 113 and receptor portion 114 (FIGS. 6 and 7) to prevent longitudinal misalignment and to maintain interlocked configuration of half-link pairs. In other embodiments, geometrical configurations such as prism-shaped or truncated-cone shaped projections, and correspondingly-shaped receiving portions, can be located on confronting surfaces in a manner to facilitate alignment of half-links to form an integral link module. Such half-link configurations contribute significantly to the types of materials which expand the treatment applications of the belt assembly of the present invention.

The assembled belt can be driven under longitudinal tension to advance in a linear direction in a planar travel path; and, in a curved surface path permitting an endless-belt to return to a planar travel path in an opposite direction or in a different plane. In such endless-belt travel, the plane of the central longitudinal axis of the belt does not change, even though the travel surface changes from planar to curved at certain locations during endless belt type of travel.

In addition to endless-belt type of travel, the link and coupler configurations of the present invention also enable dynamic-frictional drive along a lateral edge of the weld-free belting. For example, dynamic frictional drive is used along inner circumferences of a serpentine path and along the inner circumference of a spiral path arrangement in which the travel path gradually rises or falls in relation to a centrally-located curved drive surface.

The assembled belt 92 (FIG. 5) provides intermediate open spaces longitudinally between links for tension-drive by a sprocket in a linear direction along a travel path. In a specific embodiment, a plurality of sprockets (such as 117 of FIG. 9) can be mounted across the width of the belt and arranged for belt support and/or drive of the belt under longitudinally-directed tension. Sprocket teeth 118 interfit laterally across the width of belt 92 in the interstices formed by the staggered relationship of extended length portions of the links which results from coupling the links, as described above, across the width of the belt.

Roller support (not shown) can also be used for drive purposes by locating interfitting protrusions along its surface. Such interfitting within the configurational relationship shown in FIG. 5 takes place without disturbing the plane of travel, whether using such roller means or a plurality of sprockets positioned across the width of the belt for driving the belt under longitudinal tension along a linear path.

Figure 9:
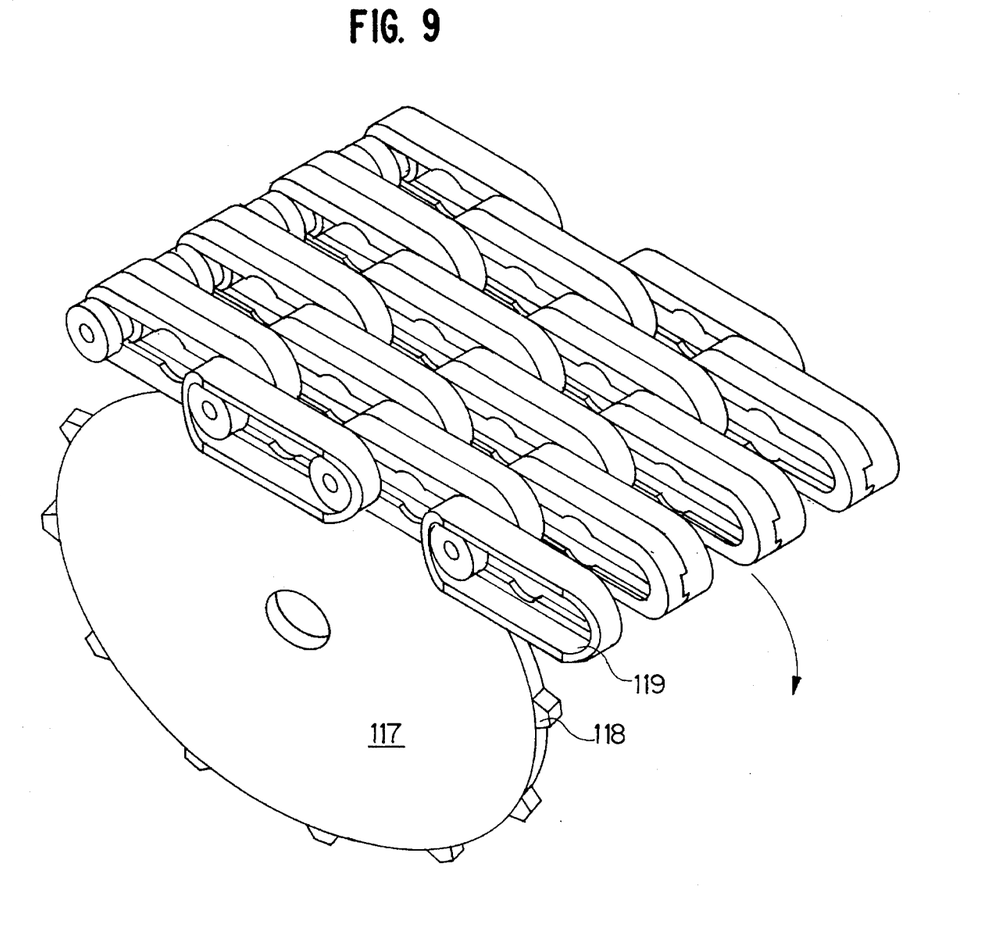
FIG. 9 is a perspective view showing structure for driving and/or supporting an endless belt embodiment of the invention; with an indication of a curved return path for the endless-belt assembly.

An open-face surface for a special lateral-edge link (such as 119) can be seen in FIG. 9. Such smooth surfaces along lateral edges provide for dynamic frictional drive by various types of curvilinear drive surfaces. The bevelled edges of such a surface (as described earlier at 106 FIG. 5) help to provide for smoother transition from lateral-edge link to lateral-edge link when using a drive surface as described in relation to FIG. 12.

Figure 10:
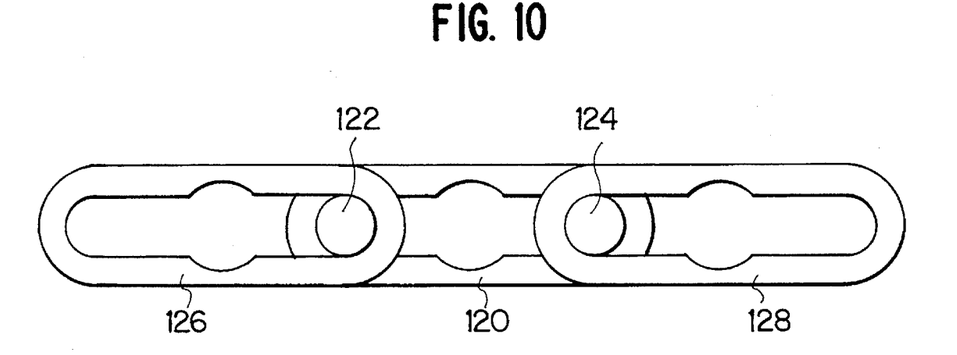
FIG. 10 is a schematic side elevational view for describing positional-relationships of the modules of FIGS. 1–4 during travel of belting with its longitudinal centerline in a straight line.

The interior cavity (such as 42 FIG. 2) of each respective link is capable, during assembly, of receiving and retaining flange portions of couplers during travel as described above. An elongated link, as shown in FIG. 10, is coupled at each longitudinal end. As shown in FIGS. 5, 9, and 10, the full longitudinal dimension of each link is used extending in the intended direction of travel.

As shown in FIG. 10, a pair of couplers are used. Centrally-located link 120, holds a coupler 122, 124 at each of its distal ends which retain links 126, 128, respectively.

The side wall entrance and interior cavity configurations of a link, such as 120, correspond to those of FIGS. 1 and 2 and provide for receiving and retaining a cylindrical main body portion 74 of an elongated coupler 76 (FIG. 4) or two flange members of separate couplers in widthwise-aligned abutment. During linear travel (with central longitudinal axis remaining in the same vertical plane), the coupled links remain substantially extended, as shown in FIGS. 5, 9, and 10; each of the pair of couplers held by the link being at a distal end location of the elongated link. That type of extension substantially continues as a belt travels around a curved support surface of an endless travel path to return to planar travel.

Such positioning of a coupler at each of the longitudinal distal ends of an elongated cavity of each link facilitates articulated pivotal rotational movement of each link of a related pair of links, such as 126, 128 (FIG. 10) about its respective coupler 122, 124; that type of relationship continues throughout the length of an endless belt.

Figure 11:
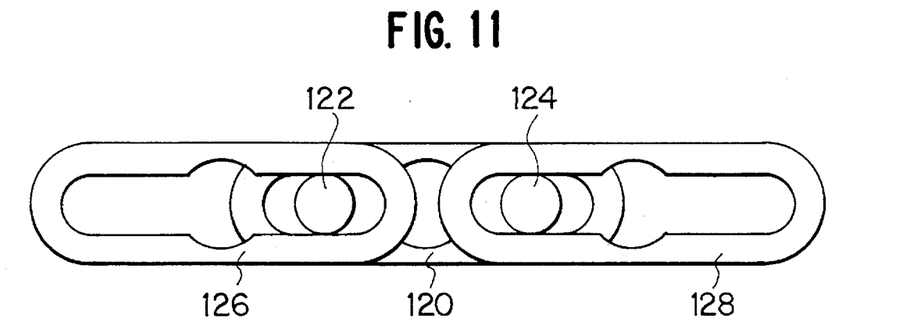
FIG. 11 is a schematic side elevational view for describing relative movement of the components of FIG. 10 during travel of the longitudinal centerline of the belt in a curvilinear path.
Figure 12:
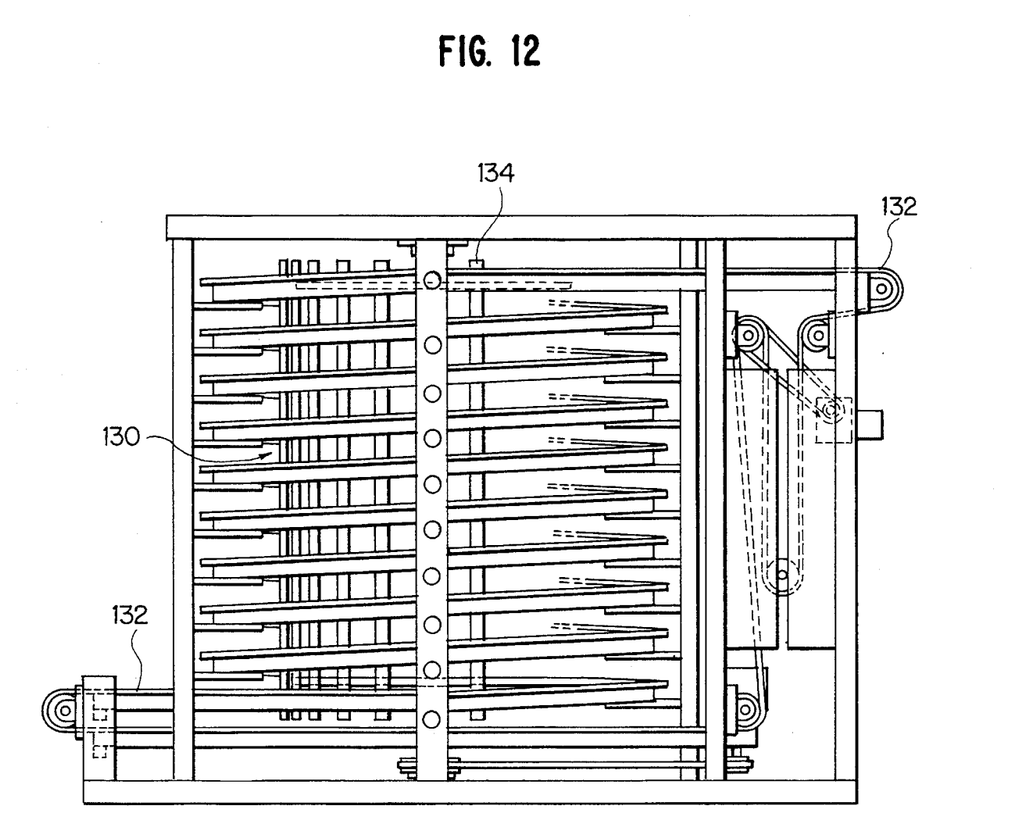
FIG. 12 is a side elevational view, partially in section, for describing combinations of travel paths and drive methods made possible by the invention.

Reference is made to FIG. 11 for purposes of describing the type of longitudinal relative motion which occurs along the inner circumference of a curvilinear path. Couplers 122, 124 move in the longitudinal direction, within the interior cavity of link 120, so as to facilitate relative lengthwise collection along an inner circumference lateral edge located along a curvilinear rotational drive surface. For example, when entering, traveling through, or exiting a serpentine travel path or a helical-path stacked arrangement (as shown in FIG. 12) the inner circumference of the belt is collected; and, such collected action of the inner circumference gradually diminishes across the width of the belt.

Upon exit from such an inner circumference, the length of the belt along such inner lateral edge, and gradually across the width of the belt, increases; and the extended length of the belt is returned for linear travel in which the central longitudinal axis of the belt is in the same vertical plane.

In addition to eliminating the welding of metal connector rods and wire spirals, the above provisions for both linear travel and collection and extension capabilities for curvilinear travel paths enable both longitudinal tension drive and dynamic frictional drive to be carried out on the same embodiment of an assembled belt.

The collection and subsequent extension are graduated across the width of the belt with maximum collection and extension taking place at the lateral edge of the belt on the inner periphery along a curvilinear travel path.

A vertically-oriented curved-surface rotational drive means is provided in FIG. 12. Cylindrical configuration rotational drive means 130 is positioned at the center of a helically-directed travel path. Contact of the inner circumference lateral edges of the belt, at each level of the helical path, with the cylindrical surface (at each such level) frictionally drives assembled belt 132.

Upon entering the curvilinear travel path, the belt is collected (as in FIG. 11) along its inner perimeter. The driving surface of the rotary drive means is selected, in conjunction with the contact surface on the lateral-edge links, to provide desired dynamic-frictional drive force. The coefficient of friction of such lateral-edge surface of the assembled belt and of the rotary drive surfaces are preselected to take into consideration the expected load carried on the belt.

Surface-engaging elements 134 of rotary drive 130 can be disposed to present an open cylindrical-configuration surface which will cooperate with lateral-edge links, such as 119 (FIG. 9), in a manner to help eliminate laterally-directed vibration in the belt. The circumferential surface dimensions of drive components 134 can be selected so as to bridge the distance between flat surfaces such as 99 of FIG. 5, or the beveled edge surfaces 106 of the lateral-edge links. As taught herein, smooth, selectively non-reentrant surfaces in contiguous relationship along the lateral edge of a belt, and elimination of protrusions beyond the surface 99 of the lateral-edge links of the belt (as shown in FIGS. 5, 9) cooperate to provide substantially vibration-free dynamic frictional drive of the belt, around the stacked-layer helical travel path of FIG. 12, notwithstanding that the vertically-oriented stakes 134 around the periphery of rotary drive means 130 do not present a solid cylindrical surface.

Such teachings also enable dynamic frictional drive for curvilinear travel to follow an S-curve movement in a substantially horizontal path; for example, to travel to a plurality of work stations for the items being conveyed. The belt can be collected and extended as necessary to provide dynamic frictional drive along either lateral edge of the belt in a specific path.

A desired dynamic frictional drive surface is provided along both lateral edges of the belt to enable such frictional drive to be carried out along the inner-circumference of any portion of a curvilinear travel path where the belt components are presented in longitudinally-collected configuration; and, to enable the belt to be frictionally driven in either direction in various arrays for the belt.

The selection of materials made possible by the configuration of the present invention increases coefficients of friction for contact surfaces of the belt and the rotary drive means to provide desired driving force consistent with conveyed load requirements.

Also, the rate of movement of the peripheral surface of the rotary drive means exceeds that of the inner lateral edge surface of the belt. Availability of differing materials increases that range of selection as well. Such selections also increase the conditions under which the travel path can be enclosed so as to be able to subject conveyed items to unusual atmospheres and/or unusually high temperature conditions.

As contemplated by the invention, the described configurations increase the range of treatments available while conveying materials. Belt module configurations as shown enable high pressure mechanical compaction in dies of pulverant ceramic materials which can be used for both links and couplers to increase the range of temperature treatments available, as well as the range of gaseous atmosphere or liquid treatment available for conveyed items. These compaction configurational teachings of the invention extend to compaction-molding of powdered metals for belt materials made available to expand the range of static and dynamic loading during assembly and use, and the range of physical conditions of temperature, atmosphere and treatment chemicals during use. Both the ceramic and powdered metal materials are sintered by high temperature treatments after high pressure compaction.

The configuration teachings of the invention also enable molding of suitable polymeric materials; selected, for example, from propylenes, nylons, urethanes, ABS copolymers and other industrial plastics. Also, injection-molded plastics can be surface-coated to improve wear resistance or provide a surface finish preventing adherence of extraneous materials. And reinforcement materials can be used to increase strength of plastic components.

Molding of pulverant ceramic materials and/or powdered metals or alloys at high compaction pressures is enabled and made practical by the configurations taught. Sintering treatment at elevated temperatures removes carrier-adhesive materials when used and is relied on to further compact the material and enhance its characteristics for belt component usage.

By making such selection of ceramic materials available for molding of components and enabling modular assembly of belting, added strength and other characteristics are made practical for conveyor belt treatment of conveyed items above the temperatures previously available. Also, gaseous atmosphere or liquid chemical treatment is made practical with chemical constituents which previous belts could not withstand. Materials for compaction are also selected to provide abrasion and chip-resistant properties for the components, and to provide suitable surface toughness for frictional-drive applications.

Economically suitable ceramic materials are selected from such ceramic materials as aluminum oxide, zirconia, magnesia, silica carbide, silicon nitride, tungsten carbide, and combinations thereof. Binders used for compaction of pulverant ceramics can be burned off in curing or driven off during compaction under pressure and heat. Compacting and sintering of the combination of particulate tungsten carbide and aluminum silicate can provide high wear-resistance and desired tensile strength properties under high temperature conditions.

Powdered metals are heat treated, after high pressure compaction, to achieve substantially cast metal cast density; suitable powdered metals and/or alloys are selected for desired physical, mechanical, magnetic, or electrical properties while minimizing dimensional shrinkage during sintering. Cylindrical configuration couplers can be machined from metal rods having similar properties to the powdered metal links.

Molded polymeric materials selected, for example, for couplers, can embody lubricants which become available at the surface during use to facilitate the rotation of links about such couplers.

As taught herein, the half-link elements of FIGS. 6 and 7 are compacted and, after suitable curing and/or sintering treatment, a pair of such half-links (such as 110 and 112) are joined to form an integral elongated link. The half-links, as compacted, provide confronting surface configurations which provide for alignment during joinder and facilitate continued alignment after such joinder. Adhesives along such confronting surfaces augment the strength of the integrated link formed from two half-links.

Polymeric materials can be used as a carrier for particulate ceramics or powdered metals to provide for molding of modules of differing characteristics. The carrier and the pulverant material can be combined to provide properties not available by injection molding solely polymeric material. For example, a desired level of magnetic properties for the modular links can be achieved by proper selection of particulate ceramic and/or powdered metal materials, while maintaining easy-cleaning properties of a plastic.

Preferred characteristics of various materials are selected and/or combined in various components. Coupler modules can be fabricated from metallic rod, among other materials, and the above-described spaced apart grooves can be machined into cylindrical surfaces of the rod. Molding of both link and coupling components from particulate ceramics, powdered metals, and/or polymeric materials as taught herein eliminates significant machining steps, among other advantages discussed above.

The sprocket drive capabilities of the invention are enhanced through use of ceramics, powdered metals, reinforced plastic composites, and/or durable surface coating materials which increase the working life for tension driven applications. Surface wear resistance of link, or coupler, modules can be augmented by the selection of materials, as discussed above.

The modular assembly contributions made available by the invention enable belt assembly to selected lengths and widths. A leading end of an assembled length of belting can be coupled to a trailing end, as described above for belt assembly, to provide endless-belt configurations which are weld-free. The invention enables both length and width dimensions for a belt to be selected and carried out at the belt user's site.

The following table presents dimensional data for a specific embodiment of the invention. Dimensions are provided in inches; with tolerances, in general, of plus or minus one percent on dimensions and plus or minus one degree on angles. However, the axial dimensions of coupler flanges are limited to minus tolerances (for example 0.245 inch with a minus 0.010 inch tolerance; and, coupler grooves are limited to plus tolerances (for example, 0.252 inch plus 0.010 inch tolerance).

Also, a tumbler radius is provided on coupler edges of about 0.005 to 0.010 inch. And, the access opening on an elongated link (of about 0.75 inch) is limited to a plus tolerance (from 0.000 to about 0.015 inch). The slot opening is limited to a plus tolerance (of about 0.010 inch) and the overall height between opposed surfaces of a link is limited to a plus tolerance (of about 0.010 inch).

| Dimensional Data | |
|---|---|
| Link 20 | |
| height | 1.0 inch |
| length | 3.0 inches |
| width | .75 inch |
| Access Opening 44 diameter | .75 inch |
| Slots 50, 52 (measured from access opening 44) | |
| length | 1.375 inches |
| height | .5 inch |
| Surfaces 72, 73 width | .125 inch |
| Alignment member 113 | |
| width | .06 inch |
| length | .271 inch |
| Alignment Projection 115 | |
| width | .06 inch |
| length | .308 inch |
| Alignment Receptor 116 | |
| width | .06 inch |
| length | .318 inch |
| Lateral-End Link 98 | |
| distal end width | .365 inch |
| central width | .5 inch |
| length | 3.03 inches |
| Elongated Coupler 76 axial length | 1.5 inches |
| Flanges 80, 82 | |
| axial length | .249 inch |
| diameter | .740 inch |
| Central Member 78 | |
| axial length | .498 inch |
| diameter | .740 inch |
| Grooves 84, 86 | |
| axial length | .252 inch |
| diameter | .249 inch |
| Foreshortened Coupler 68 axial length | .75 inch |
| Flanges 64, 66 | |
| length | .249 inch |
| diameter | .740 inch |
| Groove 70 | |
| axial length | .252 inch |
| diameter | .249 inch |
| Coupler Connectors Truncated Shaped 88, 90 | |
| length | .108 inch |
| angle | 60° |

Specific configurations, dimensions, arrangements and materials have been set forth for purposes of describing the invention. However, it should be recognized that changes in those specifics can be available to those skilled in the art in light of the above teachings while relying on novel concepts of the invention. Therefore, in determining the scope of the present invention, reference shall be made to the accompanying claims.

I claim:

1. A combination of modular components for use in weld-free assembly of belting to extend lengthwise in the direction of intended travel and widthwise in transverse relationship to such direction, comprising (A) an elongated link, having:
  (i) a longitudinal axis extending in the direction of intended travel,
  (ii) external surfaces which, at least in part, define an upper conveying surface, an oppositely disposed lower surface, and a side wall surface on each side of such link, with such side wall surface extending so as to join upper and lower surfaces and so as to join longitudinal distal ends of the elongated link,
  (iii) an elongated internal cavity means encased within such external surfaces and extending in the direction of the longitudinal axis of the elongated link,
  (iv) opening means defined along each side wall surface providing side wall access from each side wall into the internal cavity means, each such side wall surface defining:
    (a) an entry portion, which is located intermediate longitudinal distal ends, presenting an access opening into the elongated internal cavity means of each such link, and
    (b) elongated slot means, which extend longitudinally in such side wall surface from such access opening toward each longitudinal distal end of the elongated internal cavity within the elongated link, such access opening having at least one cross-sectional dimension which is larger than a corresponding dimension of the slot means; and (B) unitary coupler means, in which each coupler includes:
  (i) a central axis which, during belt assembly, is oriented in transverse relationship to the direction of intended travel,
  (ii) a pair of flanges, one each on each longitudinal distal end of the coupler, for coupling a pair of links in widthwise side-by-side relationship, such pair of links enabling widthwise side-by-side coupling with respective longitudinal axes of such links extending in such direction of intended travel during assembly, (iii) a circumferential groove means located intermediate such flanges, such groove means presenting a recessed surface of smaller diameter than either such flange, such groove means being disposed substantially perpendicularly transverse to the central axis of such coupler, (iv) each such coupler flange having cross-sectional dimensional and configurational characteristics to permit entry through the entry portion of the side wall of an elongated link into its elongated internal cavity means, and to be retained by such slot means, with such coupler groove means permitting lengthwise-directed movement of the coupler along such link by coacting with the link sidewall structure defining slot means along the side wall of the link, and enabling pivotal rotational movement of an elongated link about the central axis of such coupler as the flange for such coupler is retained within the elongated cavity means; with a plurality of such couplers being provided for widthwise side-by-side assembly of a plurality of link components in lengthwise staggered relationship, to establish a width dimension for such belting.

2. The combination set forth in claim 1, in which the access opening and slot means presented on each lateral side wall surface of a single elongated link enable one each of a pair of couplers to be inserted through such access opening, retained by such slot means, to be moved within the elongated cavity means and to be retained contiguous to a respective longitudinal end of such slot means, such that each such coupler extending from each lateral side of the link enables an additional elongated link to be assembled in staggered relationship to extend lengthwise in such direction of intended travel, with each such additional link capable of pivoting about its respective coupler in relation to the link in which the remaining distal end of the coupler is retained.

3. The combination set forth in claim 2, in which such coupler means include:

elongated couplers with an intermediate body portion having an axial length substantially equal to about twice the axial length of a distal end flange;

such intermediate body portion of a coupler being in alternate longitudinal end relationship with a pair of distal end flanges, as assembled, within the internal cavity means defined by a single elongated link of such assembly.

4. The combination set forth in claim 1, 2, or 3, in which the capability of pivoting elongated links about couplers retained by such links enables belting, as assembled, to move from a linear substantially planar path in the direction of travel into a curved surface path for establishing an endless belt travel configuration, and enables return from such curved surface path into a linear substantially planar path.

5. The combination set forth in claim 1, 2, or 3, in which the slot means enable couplers within such combination to move from longitudinal distal ends of an internal cavity within an elongated link to provide for longitudinally-directed relative movement of such couplers and links into lengthwise collected orientation for an assembled belt along an inner circumference during movement from a linear path into a curvilinear path in substantially the same plane of travel, and, upon exit from such curvilinear travel path, to move relative to each other to re-extend from such lengthwise collected orientation along such inner circumference for return to a linear travel path.

6. The combination set forth in claim 2, in which the couplers present an elongated cylindrical configuration about such central axis, with such groove means adjacent to each flange define a middle body portion intermediate such distal end flanges, and such slot means of the elongated link have cross-sectional dimensional and configurational characteristics to enable retaining a pair of laterally-aligned couplers for widthwise extended assembly of alternate links and couplers into belting, with such widthwise extended belting being capable of travel in an endless-belt configuration and in a curvilinear travel path in which longitudinally-directed relative movement between couplers and links provides for collection and extension along the inner circumference of curvilinear travel paths in substantially the same plane.

7. The combination set forth in claim 1, 2, or 3, in which such elongated link is formed from a pair of elongated half-links positioned in opposed confronting relationship having their respective longitudinal axes parallel to such direction of intended travel, and including means for sandwich assembly of such half-links in aligned integrated relationship so as to define such elongated cavity means internally of such assembled pair of half-links.

8. The combination set forth in claim 7, in which each elongated half-link presents means along confronting side surfaces for aligning and interlocking a remaining half-link of such pair to form an integral link.

9. The combination set forth in claim 8, in which such interlocking means include male and female interfitting means which physically interfit to hold such half-links so as to prevent relative movement therebetween, and further including adhesive means therebetween.

10. The combination set forth in claim 1, 2, or 3, further including:

elongated lateral-edge link means for use on a lateral edge of an assembled belt, each such lateral-edge link having a longitudinal axis extending in the direction of intended travel, with
(A) an interior side wall extending so as to join longitudinal distal ends of the lateral-edge link; such interior side wall surface defining
   (i) an access opening, and
   (ii) slot means;
(B) an exterior side wall extending between such longitudinal ends of the lateral-edge link,
   such exterior side wall presenting a protrusion-free surface.

11. The combination of claim 10, in which such exterior side wall of such lateral-edge link also presents a surface which is bevelled internally with respect to such longitudinal axis at each longitudinal distal end of such exterior side wall.

12. The combination set forth in claim 7, in which each such half-link is molded from pulverant ceramic material and sintered to form a hardened unitary half-link, and each such coupler is molded from pulverant ceramic material and sintered to form a hardened cylindrical configuration coupler.

13. The combination set forth in claim 12, in which such ceramic material is selected from the group consisting of aluminum oxide, zirconia, magnesia, silica carbide, silicon nitride, tungsten carbide, and combinations thereof.

14. The combination set forth in claim 7, in which such half-links and couplers are molded from polymeric material selected from the group consisting of propylenes, nylons, urethanes, and ABS copolymers, and cured to establish thermoset characteristics.

15. The combination set forth in claim 7, in which such half-links and couplers are molded from powdered metals and sintered to desired density.

16. A lengthwise extended belt assembled from the combination set forth in claim 7, in which such distal end flanges of such couplers engage corresponding flanges of contiguous couplers within cavity means of a pair of similar laterally-adjacent links so as to form integral rods extending widthwise across a preselected width dimension of the assembled belt, such integral rods are spaced lengthwise according to the preselected uniform length dimensions of the assembled links, and such links are configured for pivoting about respective integral rods during curvilinear movement of the belt in an endless travel path.

17. Method for assembling an elongated belt from individual modular structures to provide for weld-free selection of belt length dimension in the direction of intended travel and belt width dimension in transverse relationship to the direction of intended travel, comprising the steps of:

(A) providing a plurality of elongated links, each such link, having:
  (i) a longitudinal axis extending in the direction of intended travel,
  (ii) external surfaces which, at least in part, define an upper conveying surface, an oppositely disposed lower surface, and a side wall surface on each side of such link, with each such side wall surface extending so as to join such upper and lower surfaces and so as to join longitudinal distal ends on its respective side of the elongated link,
  (iii) an elongated internal cavity means encased within such external surfaces and extending in the direction of the longitudinal axis of the elongated link, and
  (iv) opening means defined along each side wall surface providing side wall access from each side wall into the internal cavity means, each such side wall opening means defining
    (a) an entry portion, located intermediate longitudinal distal ends of the link, and presenting an access opening into the elongated internal cavity means of each such link, and
    (b) elongated slot means, which extend longitudinally in such side wall surface from such access opening toward each longitudinal distal end of the internal cavity of the elongated link,
    such access opening having at least one cross-sectional dimension which is larger than a corresponding dimension of the slot means;

(B) providing a plurality of elongated couplers, each such coupler including:
  (i) a central axis which, during belt assembly, is oriented in transverse relationship to such direction of intended belt travel,
  (ii) a pair of flanges, one each on each longitudinal distal end of a coupler,
  (iii) a circumferential groove means of smaller cross-sectional area than either such flange and located adjacent to each flange in the direction of the remaining flange;
    (a) such groove means being disposed substantially perpendicularly transverse to the central axis of such coupler, (b) each flange having cross-sectional dimensional and configurational characteristics to permit entry through the access opening of the side wall of an elongated link into its elongated internal cavity means, and to be retained by such slot means, with such coupler groove means:
  (c) permitting lengthwise-directed movement of the coupler along such link by coacting with the slot means along the side wall of the link as an axially adjacent portion of the coupler is being retained within the elongated cavity means, and
  (d) enabling pivotal rotational movement of an elongated link about the central axis of such coupler as the flange for such coupler is retained within the elongated cavity means;

(C) interconnecting elongated links, utilizing such couplers so as to provide for belt assembly of desired length in such intended direction of travel and of desired width in a direction in transverse relationship to such intended direction of travel.

18. The method of claim 17, further including (D) interconnecting elongated links from the leading end and from the trailing end of an assembled belt length with couplers so as to form an endless-belt configuration.

19. The method of claim 17, in which the elongated link is fabricated by:

molding a pair of elongated half-links, each with a single side wall and an open-faced cavity portion on the remaining side, from particulate material selected from the group consisting of pulverant ceramics and powdered metals, sintering each such molded half-link so as to harden each into a unitary structure, positioning sintered half-links molded from a single selected material with open-faced cavity portions in opposed confronting relationship, and with their longitudinal axes corresponding to the direction of intended travel, and interlocking such pair of half-links so as to encase an elongated internal cavity and to form an integral elongated link.

20. The method of claim 17, in which the elongated link is fabricated by:

injection molding a pair of half-links from polymeric material, each such pair of half-links presenting a single side wall surface in combination with external surfaces of each half-link defining an open-faced elongated half portion of an elongated cavity of an elongated link, curing such polymeric material to provide thermoset characteristics and form a pair of unitary half-links, and interlocking such pair of half-links so as to encase an elongated internal cavity and to form an integral elongated link.

21. The method of claim 19 or 20, in which interlocking such pair of half-links to form an integral elongated link is augmented by selection from the group consisting of providing mechanically-interfitting means along mating surfaces of such pair of half-links, providing adhesive means acting along mating surfaces of such pair of half links, and combinations thereof.

22. The method of claim 19, further including selecting a ceramic material from the group consisting of aluminum oxide, zirconia, magnesia, silica carbide, silicon nitride, tungsten carbide, and combinations thereof, and fabricating elongated links and couplers for a belt assembly by compacting and sintering such selected ceramic material.

23. The method of claim 19, further including selecting a powdered metal for fabricating elongated links, and fabricating elongated couplers by machining metal rod of preselected diameter.

24. The method of claim 19, further including providing a plurality of elongated lateral-edge links for use on at least one lateral-edge of an assembled belt, such lateral-edge links having an interior side wall defining an access opening and slot means extending therefrom, and an exterior side wall presenting an open-face surface, such lateral-edge links having dimensional and configurational characteristics enabling use with such elongated links and couplers of an assembled belt.

25. Method for assembly of a belt with lateral-edge links as set forth in claim 24, further including positioning such lateral-edge links along at least one lateral edge of such endless-belt to provide for dynamic frictional drive along the inner periphery of such belt when in a curvilinear travel path in substantially the same plane, by enabling relative longitudinal movement between such links providing for collection of such links and such lateral-edge links along such inner periphery when entering such curvilinear travel path in substantially the same plane, and providing for relative longitudinal movement extension between such links and lateral-edge links upon leaving such curvilinear travel path.

* * * * *